United States Patent
Kief et al.

(10) Patent No.: US 8,848,316 B2
(45) Date of Patent: Sep. 30, 2014

(54) PERPENDICULAR WRITE HEAD WITH LAMINATED SIDE SHIELDS

(75) Inventors: Mark Thomas Kief, Lakeville, MN (US); Alexandru Cazacu, Derry (IE); Kaizhong Gao, Eden Prairie, MN (US); Mark Anthony Gubbins, Letterkenny (IE); Ibro Tabakovic, Edina, MN (US); Christina Laura Hutchinson, Eden Prairie, MN (US); David Christopher Seets, Excelsior, MN (US); James Gary Wessel, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 473 days.

(21) Appl. No.: 12/892,083

(22) Filed: Sep. 28, 2010

(65) Prior Publication Data

US 2012/0075748 A1 Mar. 29, 2012

(51) Int. Cl.
*G11B 5/11* (2006.01)
*G11B 5/127* (2006.01)
*G11B 5/31* (2006.01)
*C25D 5/12* (2006.01)

(52) U.S. Cl.
CPC ............ *G11B 5/1278* (2013.01); *G11B 5/3116* (2013.01); *C25D 5/12* (2013.01)
USPC .................................................... 360/125.3

(58) Field of Classification Search
USPC .............................................. 360/125.3, 319
See application file for complete search history.

(56) References Cited

U.S. PATENT DOCUMENTS

| | | | |
|---|---|---|---|
| 5,838,521 A * | 11/1998 | Ravipati | 360/319 |
| 7,180,712 B1 * | 2/2007 | Li et al. | 360/319 |
| 7,295,401 B2 | 11/2007 | Jayasekara | |
| 7,446,979 B2 * | 11/2008 | Jayasekara | 360/319 |
| 7,599,151 B2 | 10/2009 | Hatatani | |
| 7,712,207 B2 | 5/2010 | Pentek | |
| 8,000,064 B2 * | 8/2011 | Kawano et al. | 360/319 |
| 2005/0157431 A1 * | 7/2005 | Hatatani et al. | 360/319 |
| 2006/0245108 A1 | 11/2006 | Hsu | |
| 2007/0263324 A1 | 11/2007 | Allen | |
| 2007/0268626 A1 | 11/2007 | Taguchi | |
| 2008/0068747 A1 * | 3/2008 | Sasaki et al. | 360/110 |
| 2009/0154013 A1 | 6/2009 | Sugiyama | |

* cited by examiner

*Primary Examiner* — Julie Anne Watko

(74) *Attorney, Agent, or Firm* — Mueting, Raasch & Gebhardt, P.A.

(57) ABSTRACT

A perpendicular write head, the write head having an air bearing surface, the write head including a magnetic write pole, wherein at the air bearing surface, the write pole has a trailing side, a leading side that is opposite the trailing side, and first and second sides; side gaps, wherein the side gaps are proximate the write pole along the first and second side edges; and side shields proximate the side gaps, wherein the side shields have gap facing surfaces and include at least one set of alternating layers of magnetic and non-magnetic materials, wherein only one kind of material makes up the gap facing surfaces at the air bearing surfaces.

18 Claims, 10 Drawing Sheets

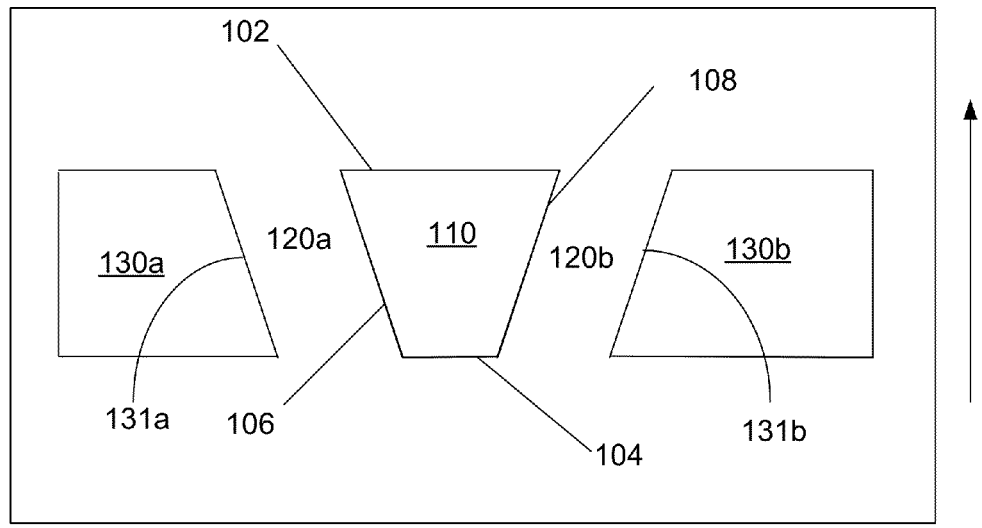
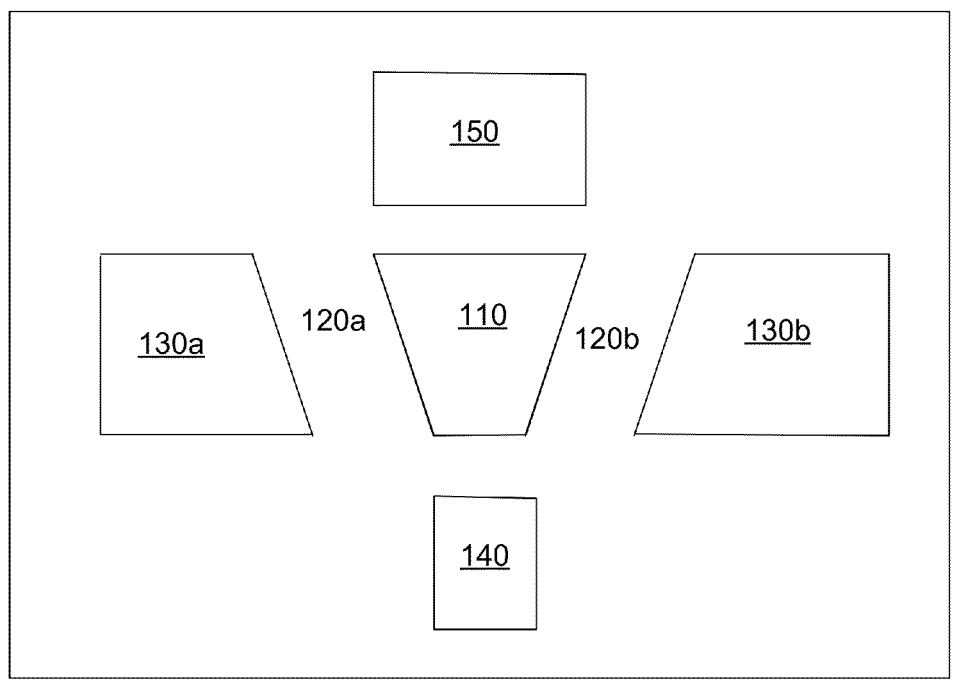

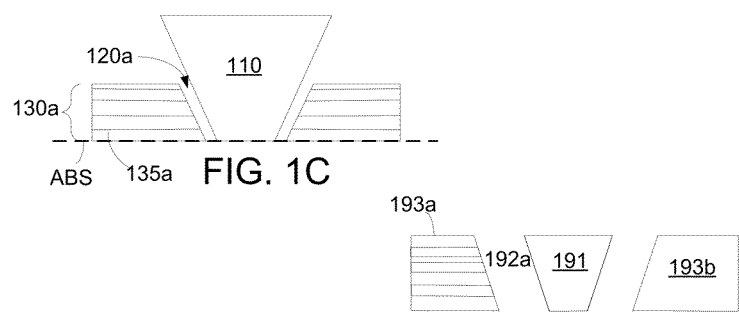
FIG. 1C
FIG. 1D
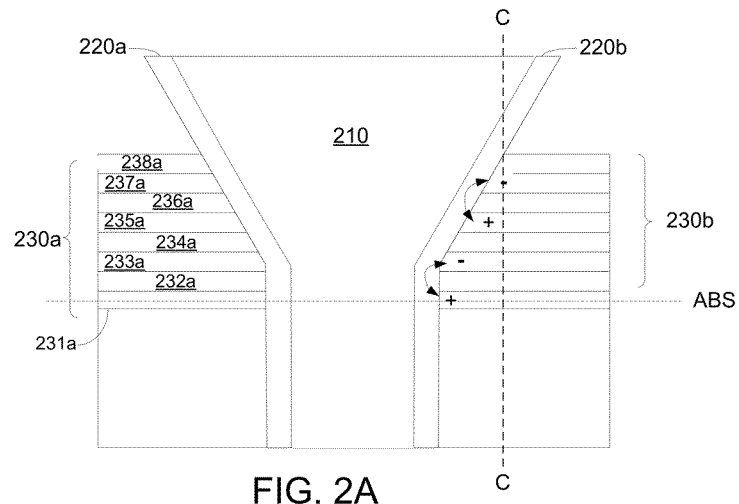
FIG. 2A

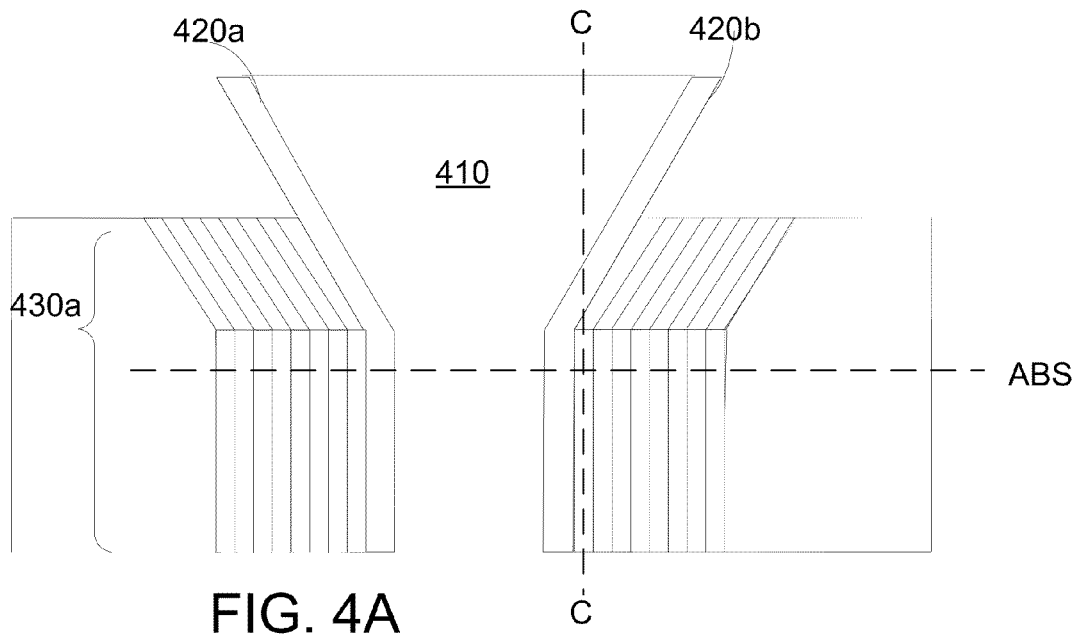
FIG. 4A
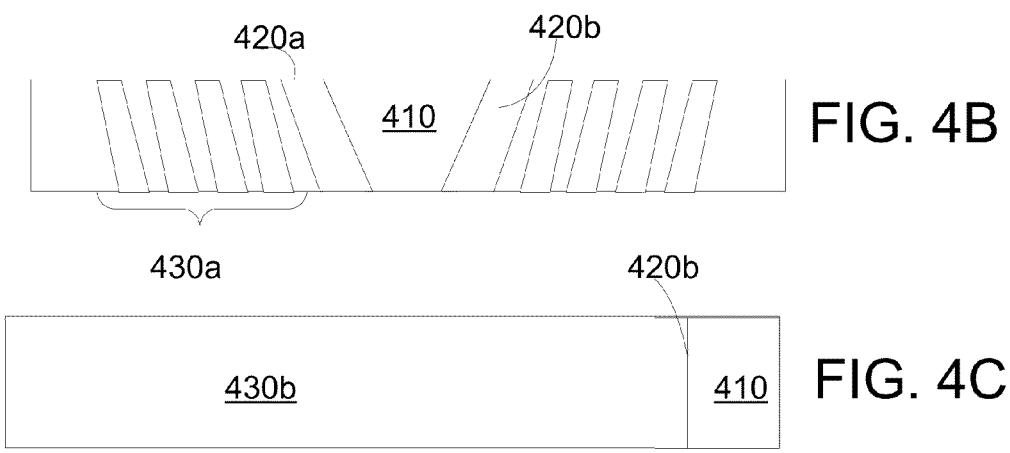
FIG. 4B
FIG. 4C
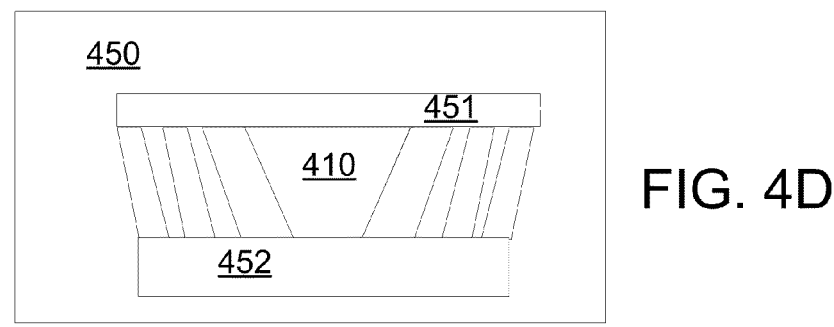
FIG. 4D

PERPENDICULAR WRITE HEAD WITH LAMINATED SIDE SHIELDS

BACKGROUND

Perpendicular magnetic recording, where the recorded data (or bits) are stored in an out of plane, or perpendicular orientation in the recording layer is one possible path towards reaching ultra high recording densities in hard disk drives. In order to reach the high recording densities, different methods of shielding the perpendicular writer paddle and pole may likely have to be uncovered. Side shields, may cause erasure.

BRIEF DESCRIPTION OF THE DRAWINGS

FIGS. 1A and 1B are schematic views of a portion of perpendicular write heads according to an embodiment;

FIG. 1C is a plan view of a perpendicular write head according to an embodiment that depicts only a single kind of material in contact with the side gap at the ABS;

FIG. 1D is a view of a portion of a write head from the ABS that does not have only a single kind of material in contact with the side gap at the ABS;

FIGS. 2A-2C are a plan view of a perpendicular write head according to an embodiment before the air bearing surface (ABS) has been defined (FIG. 2A), a view of a perpendicular write head according to an embodiment from the ABS (FIG. 2B), and a cross section view of a perpendicular write head according to an embodiment (FIG. 2C);

FIGS. 4A-4D are a plan view of a perpendicular write head according to an embodiment before the air bearing surface (ABS) has been defined (FIG. 4A), a view of a perpendicular write head according to an embodiment from the ABS (FIG. 4B), a cross section view of a perpendicular write head according to an embodiment (FIG. 4C); and a plan view of a perpendicular write head according to an embodiment that includes a leading and trailing shield (FIG. 4D);

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 2B:
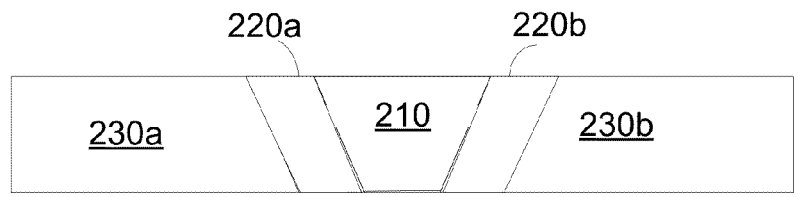

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive.

Disclosed herein are apparatuses and devices, for example perpendicular write heads. Generally, perpendicular write heads may be utilized to write data, or bits (or bytes) to magnetic recording media. Disclosed perpendicular write heads can also be part of a larger device that can include other components, for example a reader for reading the magnetic recording media. In embodiments, the larger device can be referred to as a slider.

FIG. 1A schematically depicts a disclosed perpendicular write head 100. The perpendicular write head 100, which may also be referred to herein as simply a write head, is shown from the air bearing surface (ABS). This view can also be described as the view as seen from the magnetic recording media. This write head 100 may include a magnetic write pole 110. The write pole 110, along with other components (such as a write coil and a return pole which are not shown herein) may function to induce a magnetic field from the write pole that passes through at least a portion of the magnetic recording media and back to the return pole. Although not required, the write pole 110 may have a trapezoidal shape as depicted in FIG. 1A.

The write pole 110 has four sides. The four sides of the write pole 110 can generally be identified based on the direction which the magnetic recording media moves past the write pole when in use. The usual direction of movement of the magnetic recording media with respect to the write head is shown by the arrow in FIG. 1A. Based on this direction of movement, the write pole has a leading edge 104, which is the first to reach the magnetic recording media and a trailing edge 102, which is directly opposed to the leading edge 104. The write pole 110 also has a first side 106 and a second side 108 which are generally the third and fourth sides of the write pole 110.

Proximate (or adjacent or directly adjacent) to the write pole 110 on the first and second sides 106 and 108 are first and second side gaps 120a and 120b. The first and second side gaps 120a and 120b are generally made of non-magnetic material. Proximate (or adjacent or directly adjacent) to the first and second side gaps 120a and 120b are first and second side shields 130a and 130b.

The side shields in a write head may comprise both magnetic and non-magnetic material. In embodiments, the side shields may comprise alternating layers of magnetic and non-magnetic materials. A side shield may comprise at least one set of alternating layers of magnetic and non-magnetic materials. One set of alternating layers, as that phrase is utilized herein, generally refers to one magnetic layer and one non-magnetic layer. A side shield may comprise a plurality of alternating layers, two or more sets of alternating layers, more than five sets of alternating layers, or from five to fifty sets of alternating layers.

The layers of the side shield may be laminated in different directions. For example, the alternating layers of the side shields may be laminated parallel to the ABS (which is shown in FIG. 1C), at a skewed angle to the ABS, or along the write pole (perpendicular to the ABS). Some of these types of side shields are depicted in the more specific figures that follow. These differently laminated side shields are similar in that only a single kind of material is in contact with the side gaps at the ABS. This can be seen in FIG. 1C, where it can be seen that only a magnetic layer 135a of the first side shield 130a is in contact with the side gap 120a at the ABS. This may be contrasted with the case where more than one kind of material is in contact with the side gaps at the ABS. This is depicted in FIG. 1D, where it can be seen that material from three magnetic layers (stippled layers) and four non-magnetic layers (non-stippled layers) of the side shield 193a are in contact with the side gap 192a at the ABS.

It should be noted that "a single kind of material being in contact with the side gaps at the ABS" may be considered met in the instance where one kind of material was meant to be in contact with the side gaps at the ABS, and except for manufacturing variation, only one kind of material would be in contact with the side gaps at the ABS. Each of the side shields 130a and 130b have gap facing surfaces 131a and 131b, which are identified in FIG. 1A. Side shields have gap facing surfaces 131a and 131b that are made of a single kind of material. In embodiments, side shields have gap facing surfaces 131a and 131b that are made of a single kind of material, either magnetic or non-magnetic. In embodiments, side shields have gap facing surfaces 131a and 131b that are made of magnetic material.

Generally, the magnetic and non-magnetic layers have thicknesses on the nanometer scale. Generally, the layers may be as thin as possible. Generally, the layers may have thicknesses from 1 nanometers (nm) to 100 nm, from 1 nm to 50 nm, from 1 nm to 15 nm, from 1 nm to 10 nm, or from 3 nm to 8 nm.

Layers of materials in side shields may, but need not have the same thicknesses throughout the side shields. Magnetic layers may have different thicknesses than non-magnetic layers, a first magnetic layer may have a different thickness than a second (or subsequent) magnetic layer, a first non-magnetic layer may have a different thickness than a second (or subsequent) non-magnetic layer, or some combination thereof. In embodiments, a layer or layers more proximate the side gap may have a different thickness than other layer or layers in the side shield. In embodiments, a layer at the gap facing surface may be thicker than other layers in the side shields. In embodiments, layers closer to the ABS may be thicker than layers farther away from the ABS. In embodiments, a magnetic layer at the gap facing surface may be thicker than other magnetic layers in the side shields.

In embodiments, at least one of the magnetic layers may be at least as thick as or thicker than at least one of the non-magnetic layers (or at least one of the non-magnetic layers may be thinner than or as thin as at least one of the magnetic layers). In embodiments, each individual magnetic layer may be at least as thick as or thicker than each individual non-magnetic layer (or each individual non-magnetic layer may be thinner or as thin as each individual magnetic layers). In embodiments, the ratio of the thickness of each individual magnetic layer to the thickness of each individual non-magnetic layer is from 1:1 to 20:1. In embodiments, the ratio of the thickness of each individual magnetic layer to the thickness of each individual non-magnetic layer is from 1:1 to 10:1. In embodiments, the ratio of the thickness of each individual magnetic layer to the thickness of each individual non-magnetic layer is from 3:1 to 10:1.

Generally, the magnetic material may be a material that has soft magnetic properties. Types of materials that can be used may include, for example, FeCo, CoNiFe, NiFe, FeCoX, CoNiFeX, NiFeX where X is a transition metal, and similar materials. In embodiments, the magnetic layers can be made of FeCo. Types of non-magnetic materials may include, for example, NiP, NiCu, NiRh, NiPd, NiV, and similar materials. In embodiments, the non-magnetic layers can be made of NiP. In embodiments, the magnetic layers can be made of FeCo and the non-magnetic layers can be made of NiP. The materials utilized may also be engineered via the addition of other materials to enhance various properties, including for example saturation induction (Bs), magnetic anisotropy (Hk), and resistivity.

All of the non-magnetic layers in disclosed side shields may, but need not be made of the same non-magnetic material. Similarly, the magnetic layers in disclosed side shields may, but need not be made of the same magnetic material. In embodiments, a side shield may include magnetic layers of more than one type of materials. For example, a non-magnetic layer could be between a magnetic layer of FeCo and a magnetic layer of NiFe. Alternatively, a laminated structure having a periodic structure could be utilized, an example of such a structure could include: high magnetic saturation material/non-magnetic material/low magnetic saturation material/non-magnetic material/high magnetic saturation material/non-magnetic material/low magnetic saturation material, etc. Such an embodiment could look similar to other embodiments except that every other magnetic layer would be made of a less magnetic material.

Disclosed write heads may also include other shields besides the first and second side shields. FIG. 1B depicts a disclosed write head 101 that includes the components discussed above (which are numbered similarly) as well as a trailing shield 150 proximate the gap at the trailing edge 102 of the write pole 110; and a leading shield 140 proximate the gap at the leading edge 104 of the write pole 110. Embodiments of write poles disclosed herein can include a trailing shield, or a leading shield, or both trailing and leading shields. In embodiments, disclosed write heads can include a trailing shield. In embodiments, disclosed write heads may include a trailing shield and a leading shield.

Laminated shields (for example side shields 130a and 130b) can generally function to minimize or eliminate proximal and distal erasure from the side shields. This is thought to be caused by magnetic charges adjacent to the write pole and the side shield acting as a lower reluctance short for the writer flux to the media. The disclosed laminated side shields can alleviate or completely mitigate these issues. Because the magnetic layers are thin (on the nm scale), the material grain size can be reduced, which can thereby optimize the magnetic properties of the materials.

Figure 2C:
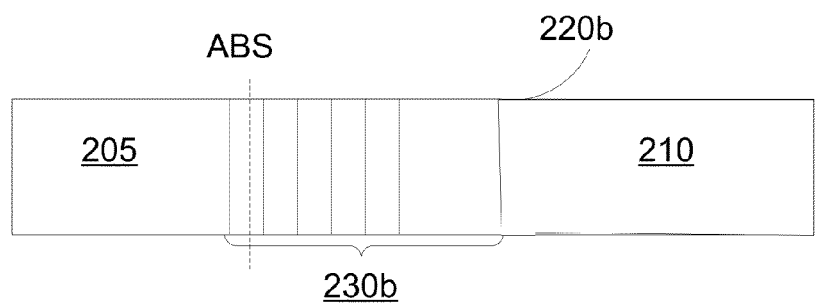

FIGS. 2A-2C depict an embodiment of a write head. FIG. 2A is a plan view of a write head before the ABS has been defined. FIG. 2B is a view from the ABS. FIG. 2C is a cross section view taken at C-C in FIG. 2A. In this embodiment, the magnetic and non-magnetic materials of the side shields are generally laminated parallel to the ABS. Stated another way, going away from the ABS through the side shield the side shield is made of alternating layers of magnetic and non-magnetic material; or the magnetic and non-magnetic layers are stacked on each other traveling away from the ABS. This can be seen in FIG. 2A, where the first side shield 230a is made of alternating magnetic layers 231a, 233a, 235a, and 237a; and non-magnetic layers 232a, 234a, 236a, and 238a. The second side shield 230b, although not numbered similarly, has the same alternating layers.

The non-magnetic layers can generally function to close the flux paths from the edges or corners of the magnetic layers. The laminated layers of non-magnetic layers can provide edge curling domains that mitigate the edge charges of the magnetic layers. The reluctance of a thin film can be much larger perpendicular to the film than it is in the plane of the film. Therefore, a high reluctance for the side shield flux leakage to the media can be obtained through the lamination of the magnetic and non-magnetic layers. The effect of the magnetic and non-magnetic layers is illustrated in the second side shield 230b, where the location of the non-magnetic layers function to cap the leakage from one magnetic layer to another by one having a positive magnetic field at the write gap and the subsequent layer having a negative magnetic field at the write gap, thereby decreasing or eliminating the overall leakage.

FIG. 2B shows the disclosed write head from the ABS. The view in FIG. 2B makes it appear as if the side shields 230a and 230b are made of a single kind of material. Proceeding into the side shield shown in FIG. 2B (i.e., proceeding into the paper), would eventually allow contact of a second layer, which would be the first non-magnetic layer seen in FIG. 2A. FIG. 2B shows that only one kind of material, a magnetic material is present proximate the gaps 220a and 220b, or more specifically at the gap facing surfaces of the side shields 230a and 230b. FIG. 2C shows a cross sectional view of the write head seen in FIG. 2A taken at line C-C in FIG. 2A.

Figure 3A:
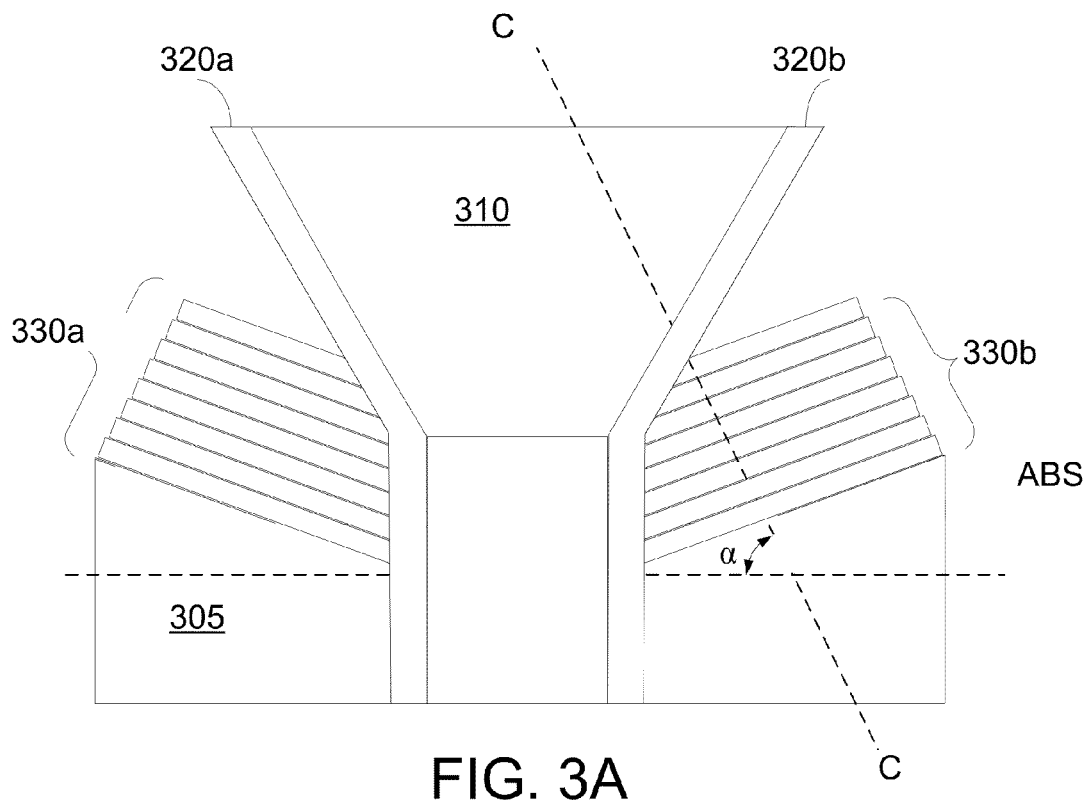
FIGS. 3A-3D are a plan view of a perpendicular write head according to an embodiment before the air bearing surface (ABS) has been defined (FIG. 3A), a view of a perpendicular write head according to an embodiment from the ABS (FIG. 3B), a cross section view of a perpendicular write head according to an embodiment (FIG. 3C), and a plan view of a perpendicular write head according to an embodiment before the air bearing surface has been defined (FIG. 3D)
Figure 3B:
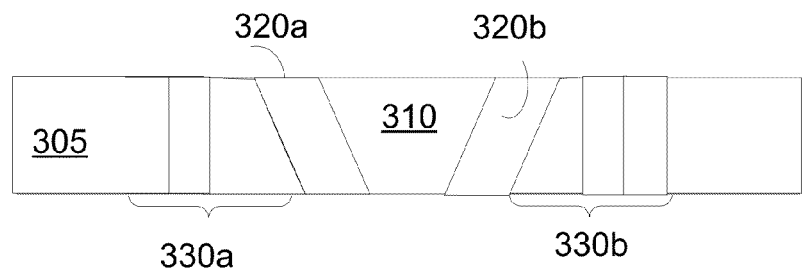
Figure 3C:
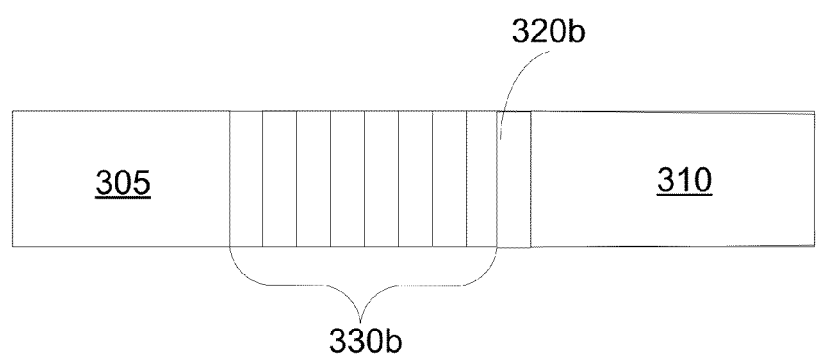

FIGS. 3A-3C depict another embodiment of a disclosed write head. FIG. 3A is a plan view of a write head before the ABS has been defined. FIG. 3B is a view from the ABS. FIG. 3C is a cross section view taken at C-C in FIG. 3A. The components in FIGS. 3A-3C are numbered similarly to FIGS. 2A-2C.

Figure 3D:
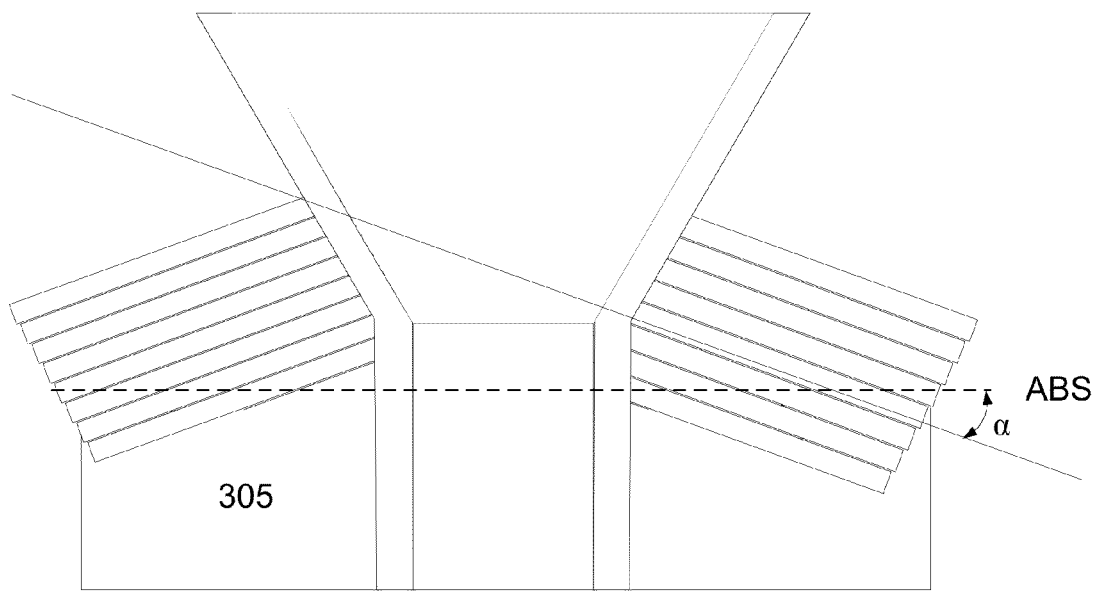

In this embodiment, the magnetic and non-magnetic materials of the side shields are laminated at an angle with respect to the ABS. The side shields in this embodiment may also be described as having an axis upon which the magnetic and non-magnetic layers are stacked, and that axis (which can be referred to as a layer axis) intersects the ABS at an angle that is not 90° (i.e, they are not stacked perpendicularly to the ABS as they were in the FIGS. 2A-2C embodiment). This angle is shown in FIG. 3A, as α. In embodiments, the layer axis of the first and second side shields α may be equal. In embodiments, the layer axis of the first and second side shields α may be from 0° to 180°. In embodiments, the layer axis of the first and second side shields α may be less than 90°. In embodiments, the layer axis of the first and second side shields α may be equal and be from 0° to 45°. In embodiments, the layer axis of the first and second side shields α may be equal and be from 10° to 20°. The layer axis may be skewed towards or away from the block. The embodiment depicted in FIG. 3D has the laminated layers skewed towards the block 305 instead of away from the block (as they were in FIG. 3A).

An embodiment such as that depicted in FIGS. 3A-3C can further increase the reluctance of the flux leakage to the media. As can be seen in FIG. 3B, this particular configuration of side shields also has only one kind of material, a magnetic material present proximate the gaps 320a and 320b, or more specifically at the gap facing surfaces of the side shields 330a and 330b.

FIGS. 4A-4C depict another embodiment of a disclosed write head. FIG. 4A is a plan view of a write head before the ABS has been defined. FIG. 4B is a view from the ABS. FIG. 4C is a cross section view taken at C-C in FIG. 4A. The components in FIGS. 4A-4C are numbered similarly to FIGS. 2A-2C.

In this embodiment, the magnetic and non-magnetic layers are laminated perpendicular to the ABS and parallel to the write pole surface, but still have only a single kind of material proximate the gaps 420a and 420b, or more specifically at the gap facing surfaces of the side shields 430a and 430b. The configuration of the magnetic and non-magnetic layers in this embodiment can be described as being stacked away from the surface of the write pole.

An embodiment such as that depicted in FIGS. 4A-4C may provide shielding of the writer flux and also provide a high reluctance of the write pole flux to minimize write field loss. An embodiment that includes trailing and lead shields that are a single body 450 can be seen in FIG. 4D. In such an embodiment, inclusion of optional trailing and leading shields 450, located beyond the trailing gap 451 and leading gap 452 may provide a flux return path away from the side shields.

Figure 5A:
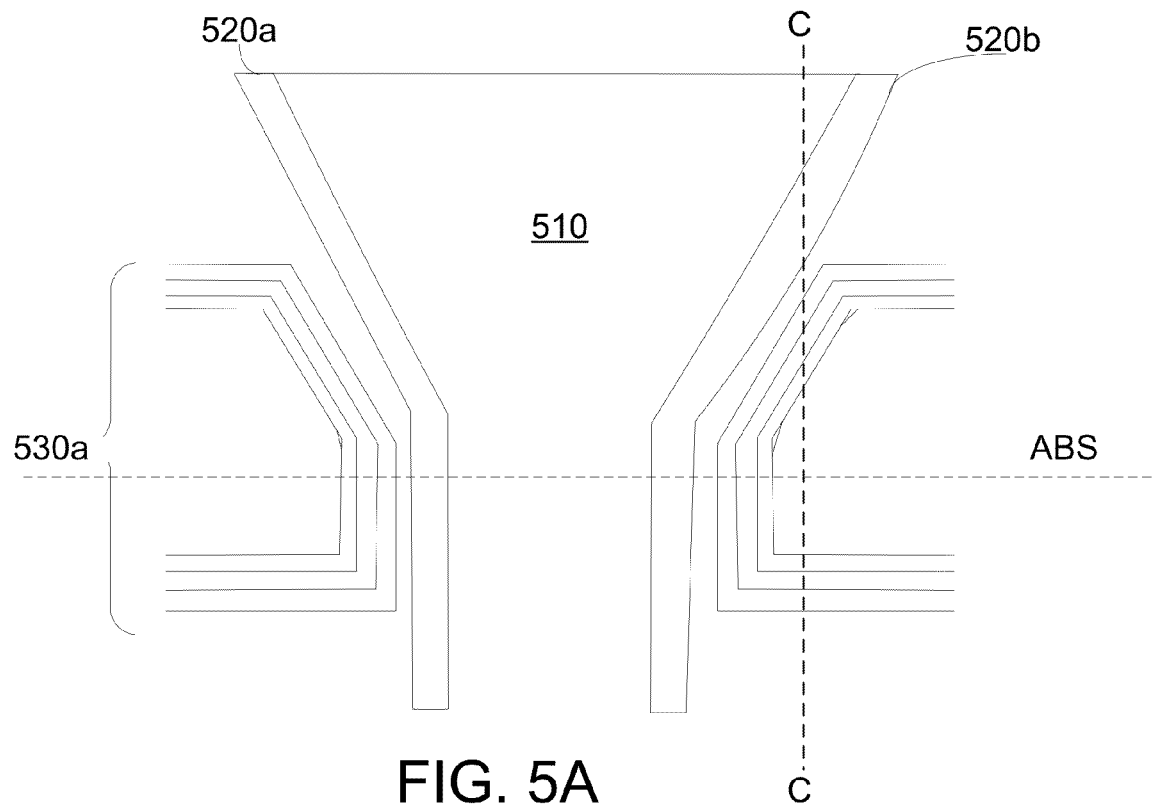
FIGS. 5A-5C are a plan view of a perpendicular write head according to an embodiment before the air bearing surface (ABS) has been defined (FIG. 5A), a view of a perpendicular write head according to an embodiment from the ABS (FIG. 5B), and a cross section view of a perpendicular write head according to an embodiment (FIG. 5C)
Figure 5B:
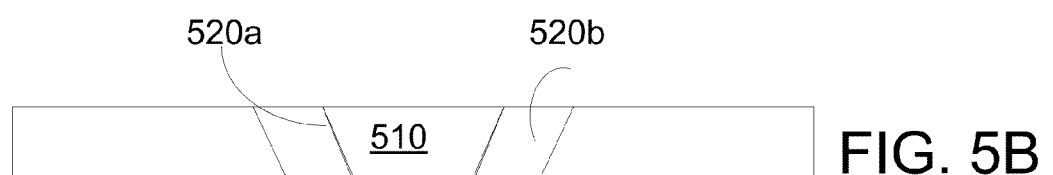
Figure 5C:
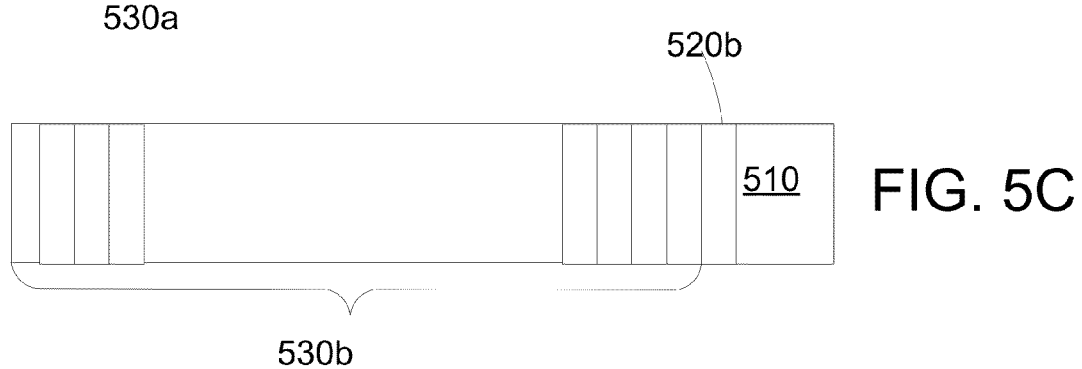

FIGS. 5A-5C depict another embodiment of a disclosed write head. FIG. 5A is a plan view of a write head before the ABS has been defined. FIG. 5B is a view from the ABS. FIG. 5C is a cross section view taken at C-C in FIG. 5A. The components in FIGS. 5A-5C are numbered similarly to FIGS. 2A-2C.

In this embodiment, the magnetic and non-magnetic layers are non-planar, at least partially follow the periphery of the write pole, and are nested. The layers can be described as nested because one layer fits entirely within the subsequent layer. More specifically, the layer that contacts the gap facing surfaces, in embodiments, a magnetic layer can completely house the subsequent layer, in embodiments a non-magnetic layer.

Disclosed side shields may be fabricated using commonly utilized techniques. Alternatively, disclosed side shields can be fabricated using disclosed methods that include electroplating. Such methods may include forming a conductive seedlayer; forming a block that encapsulates the conductive seedlayer; forming a layer of magnetic material on at least one vertical side wall of the block by electroplating and forming a layer of non-magnetic material on the layer of magnetic material by electroplating.

Figure 6A:
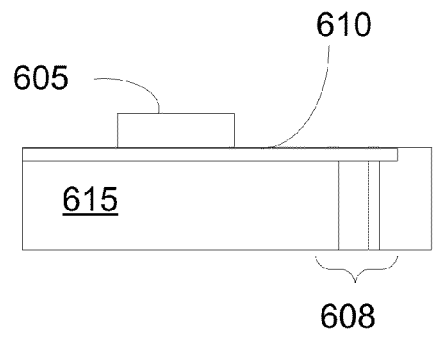
FIGS. 6A-6D depict a method of forming side shields according to an embodiment.

First, form a conductive seedlayer. The conductive seedlayer is a material that is electrically conductive and will allow material to plate out of an electrochemical plating bath. Materials that can be utilized for the conductive seedlayer may include, for example, Ru, NiFe, NiP, or similar materials. In embodiments, the conductive seedlayer can be made from Ru. The conductive seedlayer is configured within a substrate (for example a wafer) to allow electrical connection to deliver a current to the conductive seedlayer. In embodiments, the conductive seedlayer can simply be grounded to the substrate (not shown). FIG. 6A illustrates another method of configuring the conductive seedlayer within a substrate. The conductive seedlayer 605 may be in contact with a conductive non-plating trace 610 that affords electrical connection 608. In this particular example, the conductive seedlayer 605 and the conductive non-plating trace 610 may be formed on a wafer 615. The conductive non-plating trace 610 may be made of chromium (Cr) or tantalum (Ta), for example.

Figure 6B:
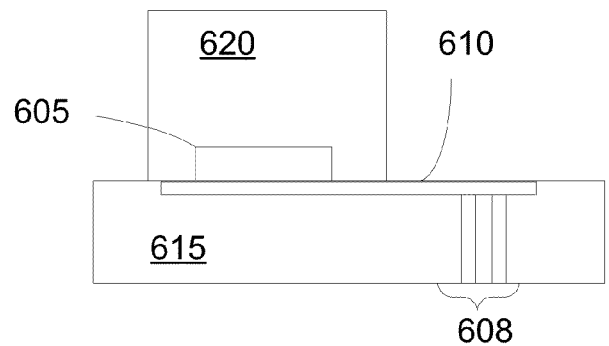

The next step includes forming a block that encapsulates the conductive seedlayer. By encapsulating the conductive seedlayer, the block can be used to form vertical laminations of magnetic and non-magnetic material by electroplating. The block generally has vertical sidewalls and a top. The block can generally be made of conductive materials. Materials that may be utilized for the block may include, for example, NiP, NiFe, Cu. In embodiments, the block can be made from NiFe. The block 620 is depicted in FIG. 6B along with the other components depicted in FIG. 6A. Because the conductive seedlayer is encapsulated and the electroplated metal will grow isotropically from the edge of the conductive seedlayer, the material will electroplate horizontally the same distance that it will plate vertically.

Figure 7A:
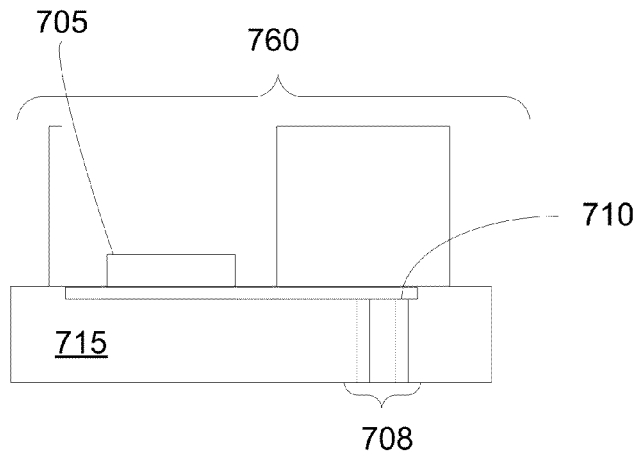
FIGS. 7A-7C depict a method of forming a block with electroplating according to an embodiment.
Figure 7B:
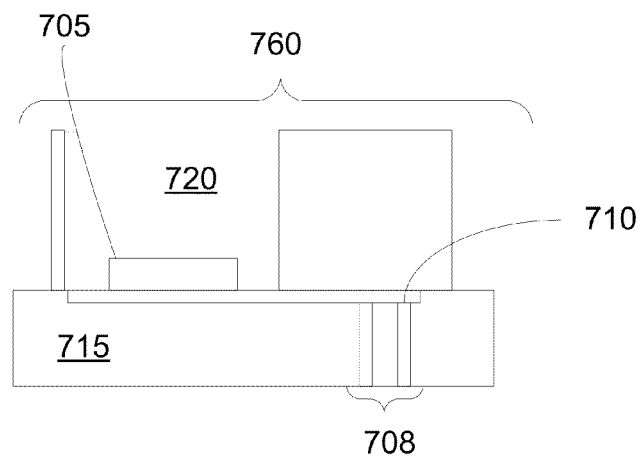
Figure 7C:
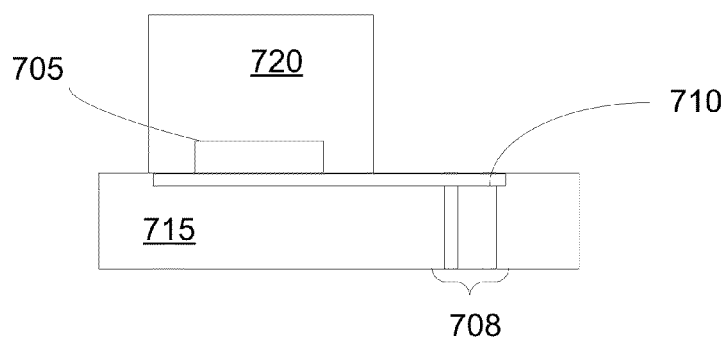
Figure 8A:
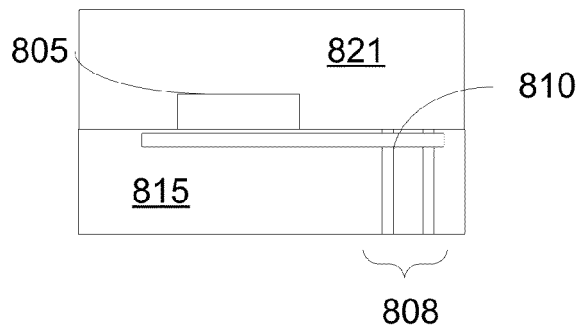
FIGS. 8A-8D depict a method of forming a block with deposition of block material according to an embodiment.
Figure 8B:
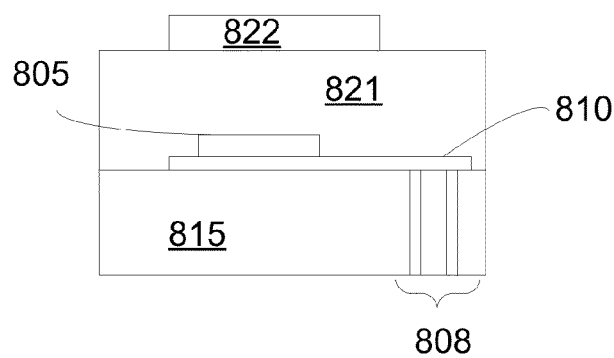
Figure 8C:
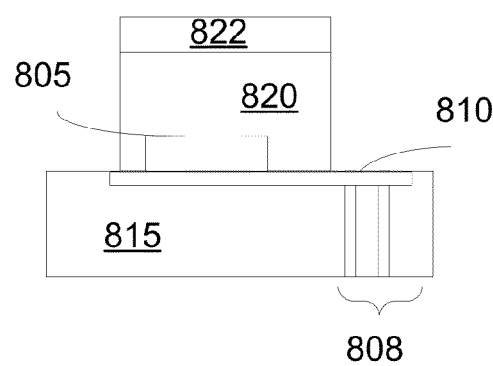
Figure 8D:
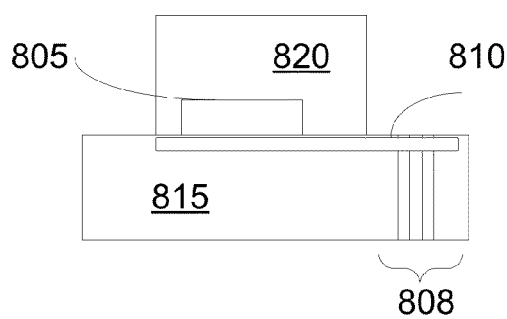

The block can be formed in numerous ways. One disclosed process of forming the block is schematically depicted in FIGS. 7A-7C. It generally includes utilizing photoresist material and electroplating the block. The photoresist material can be deposited on the substrate 715 and etched forming a photoresist negative 760, having an area above the conductive seed layer 705 clear of photoresist material (see FIG. 7A). This article can then be placed in an electroplating bath from which the block will plate. The block material will be electrodeposited in the area that is clear of photoresist material, thereby forming the block 720 (see FIG. 7B). Assuming that the photoresist material was not in contact with the conductive seedlayer, the block will then encapsulate the conductive seedlayer. The photoresist material can then be removed leaving only the block (see FIG. 7C).

Another process of forming the block is schematically depicted in FIGS. 8A-8D. It generally includes depositing the block material (a conductive material) and etching away the unwanted portions using a photoresist mask. The block material 821 may be deposited on the substrate 815 to completely encapsulate the conductive seedlayer 805 (seen in FIG. 8A). Photoresist mask 822 is then deposited on a portion of the block material 821 that is to remain to form the final block. The photoresist mask 822 may cover enough of the block material 821 so that the block may ultimately extend beyond the conductive seedlayer 805 (seen in FIG. 8B). The excess block material is then etched away using the photoresist mask 822 to protect the covered portion of the block material 821 (seen in FIG. 8C). The photoresist mask 822 is then removed leaving the block 820 that covers the conductive seedlayer 805 (seen in FIG. 8D). This method of forming a block may be more useful in situations where the block is to be less than 500 nm thick.

Figure 6C:
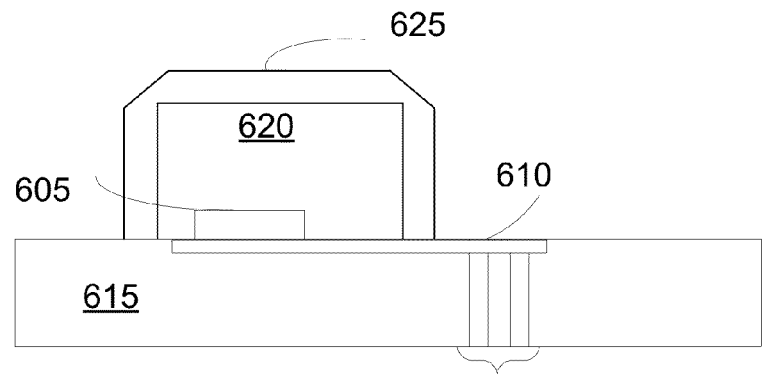

Next, in disclosed methods, a layer of magnetic material may be formed on at least one of the vertical side walls of the block by electroplating. This can be accomplished by placing the block (along with the other components on the substrate that are depicted in FIG. 6B) in an electroplating bath. The components in the plating bath can depend in part on the material being plated and the particular parameters of plating. Once the pre-determined thickness of the layer has been reached, the block can be removed from the plating bath. The pre-determined thickness of the layers can be controlled by the time in the plating bath, the plating current, the components of the electroplating bath, or a combination thereof. FIG. 6C depicts the article after a first magnetic layer 625 has been plated on the block.

Figure 6D:
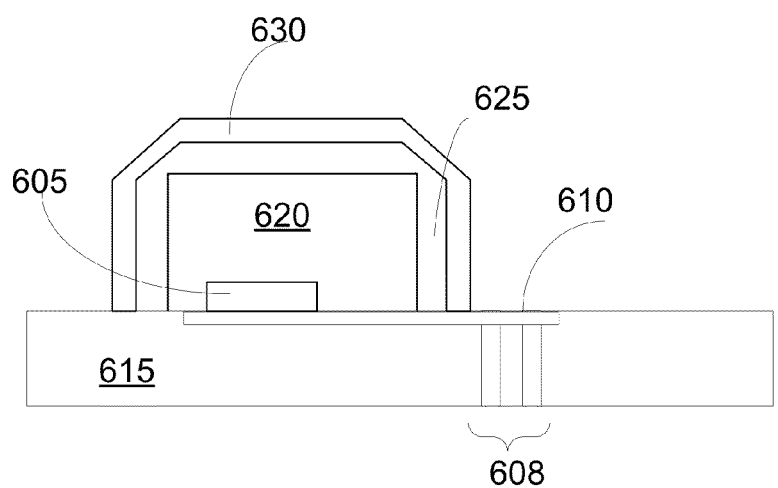

Next, in disclosed methods a non-magnetic layer of material may be formed on at least a portion of the magnetic layer by electroplating. This can be accomplished by placing the block (along with the other components on the substrate that are depicted in FIG. 6C) in a second electroplating bath. It should be noted that the second plating bath can be a different bath or the same bath with a different plating solution. The components in the second plating bath can depend in part on the material being plated and the particular parameters of plating. Once the pre-determined thickness of the layer has been reached, the block can be removed from the second plating bath. The pre-determined thickness of the layers can be controlled by time in the second plating bath, the plating current, the components of the second electroplating bath, or a combination thereof. FIG. 6D depicts the article after a first non-magnetic layer 630 has been plated on the magnetic layer 625.

The method may also include placing the block in electroplating baths in order to form subsequent magnetic and non-magnetic layers. Forming layers of magnetic and non-magnetic materials may be repeated a plurality of times until the pre-determined number of alternating layers are obtained. Disclosed methods may also optionally include patterning the block before plating if the lamination plated width is important to the design or to prevent some features from plating. Disclosed methods may also optionally include removing laminations along the top surface of the block. Etching methods, such as chemical mechanical polishing (CMP) may be used to retain only vertical laminations. Disclosed methods may also be followed, preceded, or both by further processing that may be desired to fabricate a perpendicular write head.

Figure 9:
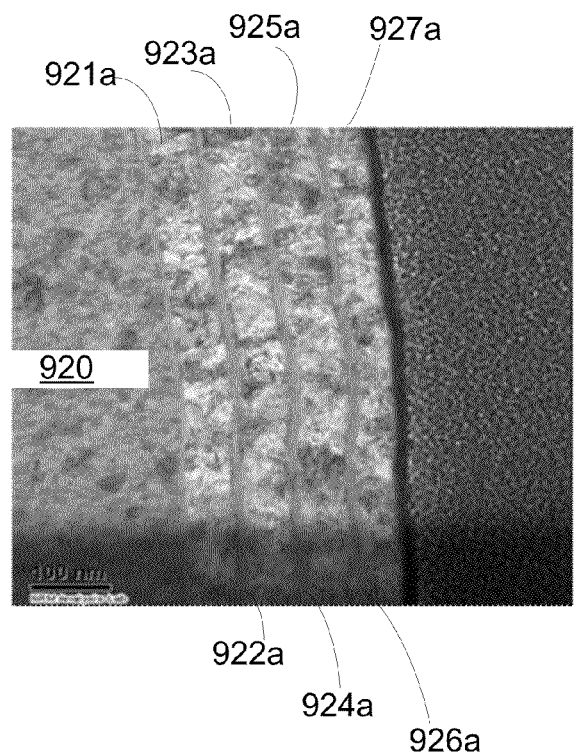
FIG. 9 is a tunneling electron microscope (TEM) image of alternating magnetic and non-magnetic layers formed using a method according to an embodiment.

FIG. 9 is a tunneling electron microscopy (TEM) image of four magnetic layers 921a, 923a, 925a, and 927a (more specifically CoFe layers) and three non-magnetic layers 922a, 924a, and 926a (more specifically NiP) that were formed using a disclosed method.

Figure 10A:
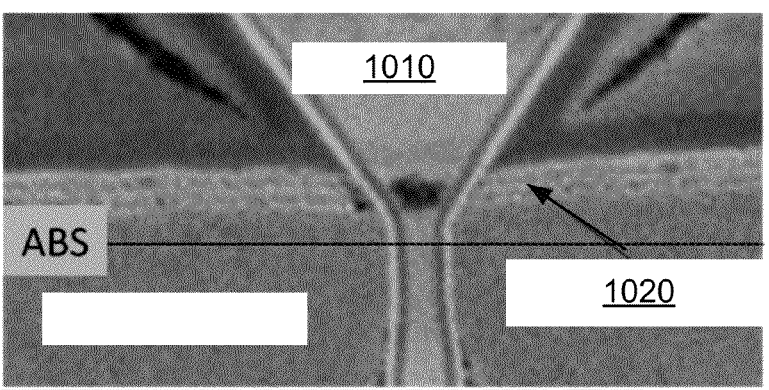
FIGS. 10A-10B are scanning electron microscope (SEM) images of a top down view of a write pole (FIG. 10A), and a top down view of a write pole with patterned laminated shields (FIG. 10B) according to an embodiment.
Figure 10B:
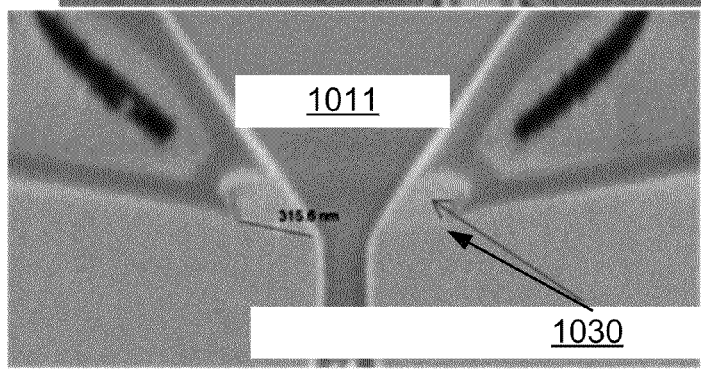

FIG. 10A shows a scanning electron microscopy (SEM) image of a top down view of a write pole with vertically laminated side shields as disclosed herein. The image in FIG. 10A shows the write pole 1010, the ABS, and the layers 1020 in the side shields. FIGS. 10B and 10C show scanning electron microscopy (SEM) images of a top down view (FIG. 10B) of a write pole with patterned vertically laminated side shields as disclosed herein.

Thus, embodiments of PERPENDICULAR WRITE HEAD WITH LAMINATED SIDE SHIELDS are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A perpendicular write head, the write head having an air bearing surface, the write head comprising:
    a magnetic write pole, wherein at the air bearing surface, the write pole has a trailing side, a leading side that is opposite the trailing side, and first and second sides;
    side gaps, wherein the side gaps are proximate the write pole along the first and second side edges; and
    side shields proximate the side gaps, wherein the side shields have gap facing surfaces and comprise at least two sets of alternating layers of magnetic and non-magnetic materials, wherein the alternating layers of magnetic and non-magnetic materials have different distances away from the air bearing surface, wherein the layers of magnetic and non-magnetic materials independently have thicknesses from about 1 nm to about 100 nm, and wherein only one kind of material makes up the gap facing surfaces at the air bearing surface.

2. The perpendicular write head according to claim 1, wherein the side shields comprise between five and fifty sets of alternating layers of magnetic and non-magnetic materials.

3. The perpendicular write head according to claim 1, wherein each individual non-magnetic layer is thinner than each individual magnetic layer.

4. The perpendicular write head according to claim 1, wherein the ratio of the thickness of each individual magnetic layer to the thickness of each individual non-magnetic layer is from 1:1 to 10:1.

5. The perpendicular write head according to claim 1, wherein the ratio of the thickness of each individual magnetic layer to the thickness of each individual non-magnetic layer is from 3:1 to 10:1.

6. The perpendicular write head according to claim 1, wherein the magnetic layers comprise a material selected from the group consisting of: FeCo, CoNiFe, NiFe, FeCoX, CoNiFeX, and NiFeX where X is a transition metal; and the non-magnetic layers comprise a material selected from the group consisting of: NiP, NiCu, NiRh, NiPd, and NiV.

7. The perpendicular write head according to claim 1, wherein the magnetic layers comprise FeCo and the non-magnetic layers comprise NiP.

8. The perpendicular write head according to claim 1, wherein the material at the gap facing surfaces at the air bearing surface is a magnetic material.

9. The perpendicular write head according to claim 8, wherein the magnetic layers closer to the air bearing surface are thicker than the magnetic layers farther away from the air bearing surface.

10. The perpendicular write head according to claim 8, wherein the magnetic and non-magnetic layers are stacked on each other in a direction parallel to the air bearing surface.

11. The perpendicular write head according to claim 10, wherein the magnetic and non-magnetic layers are stacked along a first layer axis in the first side shield and a second layer axis in the second side shield, and both the first and the second layer axes intersect the air bearing surface at equal angles of less than 90°.

12. The perpendicular write head according to claim 1, wherein the magnetic and non-magnetic layers are stacked perpendicular to the air bearing surface and parallel to the write pole.

13. The perpendicular write head according to claim 1, wherein the magnetic and non-magnetic layers at least partially follow the periphery of the write pole, and are nested.

14. The perpendicular write head according to claim 1 further comprising a trailing shield, a leading shield, or a combination thereof.

15. A perpendicular write head, the write head having an air bearing surface, and the write head comprising:
  a magnetic write pole, wherein at the air bearing surface, the write pole has a trailing side, a leading side that is opposite the trailing side, and first and second sides;
  side gaps, wherein the side gaps are proximate the write pole along the first and second side edges; and
  side shields proximate the side gaps, wherein the side shields have gap facing surfaces and comprise at least five sets of alternating layers of magnetic and non-magnetic materials, wherein the alternating layers of magnetic and non-magnetic materials have different distances away from the air bearing surface, wherein the layers of magnetic and non-magnetic materials independently have thicknesses from about 1 nm to about 100 nm, wherein the material that makes up the gap facing surfaces at the air bearing surface is magnetic material and the magnetic and non-magnetic layers are stacked on each other in a direction parallel to the air bearing surface.

16. The perpendicular write head according to claim 15, wherein the ratio of the thickness of each individual magnetic layer to the thickness of each individual non-magnetic layer is from 3:1 to 10:1.

17. The perpendicular write head according to claim 15, wherein the magnetic layers comprise a material selected from the group consisting of: FeCo, CoNiFe, NiFe, FeCoX, CoNiFeX, and NiFeX where X is a transition metal; and the non-magnetic layers comprise a material selected from the group consisting of: NiP, NiCu, NiRh, NiPd, and NiV.

18. The perpendicular write head according to claim 15, wherein the magnetic layers comprise FeCo and the non-magnetic layers comprise NiP.

* * * * *